Jan. 28, 1958 W. O. SMITH 2,821,687
GRID-TYPE WAVE GUIDE ATTENUATOR
Filed April 12, 1946

INVENTOR.
WILLIAM O. SMITH

BY

ATTORNEY

United States Patent Office 2,821,687
Patented Jan. 28, 1958

2,821,687

GRID-TYPE WAVE GUIDE ATTENUATOR

William O. Smith, Silver Spring, Md., assignor, by mesne assignments, to the United States of America as represented by the Secretary of the Navy Application April 12, 1946, Serial No. 661,598

3 Claims. (Cl. 333—81)

This invention relates to attenuation of energy flowing within a hollow wave guide, and more particularly to accurate means for controlling and varying said attenuation over a wide range.

The prior art has for some time included means for attenuation control over wave guide energy of the dominant mode. What is proposed here is a novel means of controlling attenuation, one which is effective not for the dominant mode alone but for the higher modes as well.

It is an object of this invention to provide means for controlling and varying the attenuation of energy flowing within a wave guide.

Another object of this invention is to provide means for controlling the flow of energy within a wave guide, this control to be effective for higher modes of operation as well as for the dominant mode.

A further object of this invention is to provide means for controlling the attenuation of energy flowing within a wave guide, the maximum attenuation of which can be pre-limited in the design of the device to be inserted in the wave guide.

Still another object of this invention is to provide means for controlling and varying the attenuation of energy flowing in a wave guide by inserting in the wave guide a screen composed of wires of resistive material, all wires being parallel to one another but the entire screen assembly being free to rotate at least 90 degrees in a plane normal to the longitudinal axis of the wave guide; this adjustable orientation of the screen assembly with respect to the direction of energy polarization being effective to change the attenuation of the energy as it passes through the screen.

Further objects and advantages of this invention will be apparent from the following description and claims, taken in connection with the drawings in which:

Figure 1:
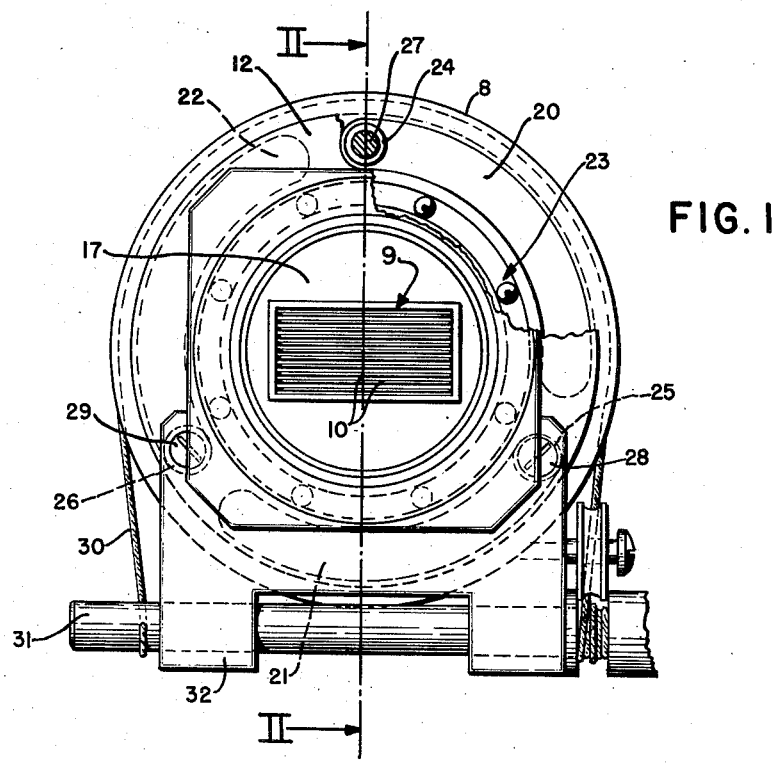
Fig. 1 is an end view partially in section of the attenuator.
Figure 2:
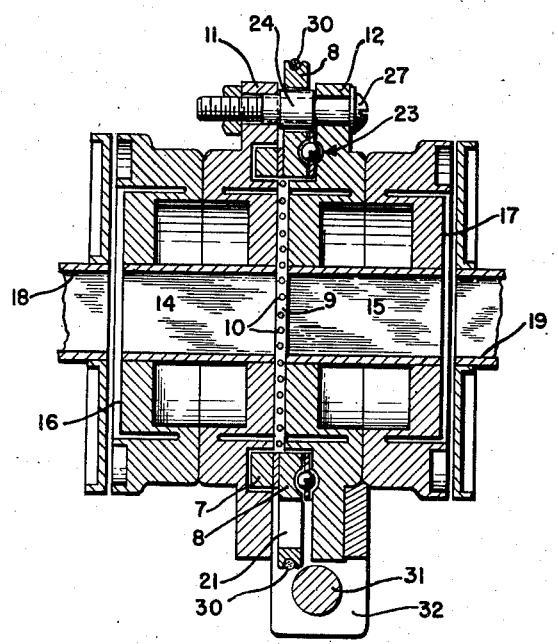
Fig. 2 is a longitudinal section taken along the line II—II of Fig. 1.

Referring to Fig. 2 there is shown a screen assembly including a circular ring 7 of rectangular cross section; a circular ball race 8; and a screen 9 consisting of a plurality of wires 10 mounted in parallel orientation. Bounding the screen assembly are clamping flange 11 and bearing flange 12. The entire assembly, as hereafter explained, is caused to rotate about the longitudinal axis of a pair of abutting wave guides 14 and 15. The screen assembly and elements 11 and 12 are so positioned that screen wires 10 lie between adjoining ends of short wave guide sections 14 and 15, and in a plane normal to their longitudinal axis. Choke flanges 16 and 17 face outward to form electrical continuity with adjoining wave guide lengths 18 and 19. The screen assembly is free to rotate between clamping flange 11 and bearing flange 12 because of (1) circumferential slotted openings 20, 21 and 22; (2) ball-bearing assembly 23; and three spacing collars 24, 25 and 26 on round-headed screws 27, 28 and 29. The screen assembly is made to rotate (in a plane normal to the longitudinal axis of the wave guide) by means of a cable 30, winding and unwinding from a control screw 31 which is threadably mounted in a bracket 32. Fig. 1 is helpful in the understanding of this motion. The angular travel of the screen assembly is limited by the extent of slotted openings 20, 21 and 22 and by the length of cable 30, but this angular travel exceeds 90 degrees (required for complete range of attenuation, from 0 to maximum), and includes the positions in which the screen wires 10 are parallel to and normal to the direction of polarization of energy within the guide.

In operation, energy from a source is transmitted down the guide, arriving at the attenuator. Assume operation in the $TE_{0,1}$ mode, and assume the attenuator screen assembly oriented in such a way as to place the screen wires normal to the direction of the electric field (the wires horizontal as shown in the figures).

To the energy, the screen then appears merely as a series of wave guides placed side by side, said apparent guides being equal in length to the diameter of the screen wires, having critical dimension (measured normal to the direction of the electric field) equal to that of the actual wave guide present; and having lesser (non-critical) dimension equal to the clear spacing between wires. In this circumstance the energy will suffer minimum attenuation, and will pass on through the device.

If however the screen assembly were rotated to place the screen wires parallel to the electric field, the critical dimension of the apparent wave guides (formed, as above, by pairs of adjacent wires) would equal the spacing between the wires. These apparent wave guides would pass some frequencies much higher than that frequency critical for the actual wave guide present, but will effectively block that latter frequency. It will readily be apparent that in this circumstance a maximum attenuation will be achieved. An attenuation of 40 db with a standing wave ratio of 1.6 has been achieved. It must be emphasized that, in order to obtain such low standing wave ratio, the screen wires must be of some highly resistive material such as Nichrome in order to dissipate energy as heat. Obviously, intermediate values of attenuation are readily achieved by utilizing intermediate positions of orientation for the screen assembly.

It is apparent that upon the spacing of the screen wires depends the maximum attenuation attainable. This of course can be controlled in the construction of the screen assembly.

It is apparent also that energy of higher modes would be attenuated in similar fashion but to lesser degree. This follows from the fact that higher modes of generation involve shorter wavelengths. The clear spacing between screen wires, established to provide a desired maximum attenuation of energy in the dominant mode, would just exceed the half wavelength of energy in some mode considerably higher than the dominant mode. That mode, the half wavelength of whose energy is just exceeded by the wire spacing, would experience no attenuation. Energy in the dominant mode experiences considerable attenuation (up to 40 db, for example, or less if desired). Energy of intermediate modes would be attenuated an intermediate amount.

What is claimed is:

1. An adjustable attenuator for a wave guide transmission line carrying microwave energy comprising, a ring of rectangular cross section, a circular bearing member, a grid formed by a plurality of parallel wires of resistive material, said ring and said bearing member coacting to mount said grid in a screen assembly, input and output sections of rectangular wave guide, a clamping flange mounted on one extremity of one of said wave guide sections, a bearing flange mounted on one extremity of the second of said wave guide sections, means for supporting said screen assembly in rotational relationship transverse to said wave guide sections between said clamping flange and said bearing flange, means for coupling said wave guide sections into said wave guide transmission line, and means for rotating said screen assembly with respect to the direction of the electric field of said microwave energy being carried by said wave guide transmission line to vary the degree of attenuation provided thereby.

2. An adjustable attenuator of the parallel wire grid type for a wave guide transmission line carrying microwave energy comprising, a ring of rectangular cross section, a circular bearing member, a grid formed by a plurality of parallel wires of resistive material, said ring and said bearing member coacting to mount said grid in a screen assembly, input and output sections of rectangular wave guide, a clamping flange mounted on one extremity of one of said wave guide sections, a bearing flange mounted on one extremity of the second of said wave guide sections, means for supporting said screen assembly in rotational relationship transverse to said wave guide sections between said clamping flange and said bearing flange, microwave choke flanges mounted on the other extremities of said wave guide sections for coupling said sections into said wave guide transmission line, and means for rotating said screen assembly with respect to the direction of the electric field of said microwave energy being carried by said wave guide transmission line to vary the degree of attenuation provided thereby.

3. An adjustable attenuator of the parallel wire grid type for a wave guide transmission line carrying microwave energy comprising, a ring of rectangular cross section, a circular bearing member, a grid formed by a plurality of parallel wires of resistive material, said ring and said bearing member coacting to mount said grid in a screen assembly, input and output sections of rectangular wave guide, a clamping flange mounted on one extremity of one of said wave guide sections, a bearing flange mounted on one extremity of the second of said wave guide sections, said circular bearing member having three equally spaced circumferential slotted openings, three spacing collars and three screw members mounting said screen assembly by said collars positioned in said circumferential slots to provide rotational relationship of said screw assembly through 120° transverse to said wave guide sections between said clamping flange and said bearing flange, microwave choke flanges mounted on the other extremities of said wave guide sections for coupling said sections into said wave guide transmission line, and means for rotating said screen assembly with respect to the direction of the electric field of said microwave energy being carried by said wave guide transmission line to vary the degree of attenuation provided thereby.

References Cited in the file of this patent
UNITED STATES PATENTS

| | | |
|---|---|---|
| 2,129,712 | Southworth | Sept. 13, 1938 |
| 2,151,157 | Schelkunoff | Mar. 21, 1939 |
| 2,197,122 | Bowen | Apr. 16, 1940 |
| 2,399,658 | Banker | May 7, 1946 |
| 2,521,818 | Aron et al. | Sept. 12, 1950 |